United States Patent
Baidya et al.

(10) Patent No.: US 11,244,440 B2
(45) Date of Patent: Feb. 8, 2022

(54) RANKING OF OBJECTS WITH NOISY MEASUREMENTS

(71) Applicant: Intel Corporation, Santa Clara, CA (US)

(72) Inventors: Bikram Baidya, Portland, OR (US); Allan Gu, Portland, OR (US); Vivek K. Singh, Portland, OR (US); Abde Ali Hunaid Kagalwalla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 16/557,906

(22) Filed: Aug. 30, 2019

(65) Prior Publication Data
US 2020/0005451 A1 Jan. 2, 2020

(51) Int. Cl.
*G06T 7/00* (2017.01)
*G06F 7/544* (2006.01)

(52) U.S. Cl.
CPC .......... *G06T 7/0006* (2013.01); *G06F 7/5443* (2013.01); *G06T 2207/10061* (2013.01); *G06T 2207/30148* (2013.01)

(58) Field of Classification Search
CPC ......... G06T 7/0006; G06T 2207/30148; G06T 2207/10061; G06F 7/5443
See application file for complete search history.

(56) References Cited

U.S. PATENT DOCUMENTS

| | | | | |
|---|---|---|---|---|
| 2002/0002415 | A1* | 1/2002 | Mugibayashi | H01L 22/20 700/110 |
| 2005/0171626 | A1* | 8/2005 | Schwarm | G05B 23/0294 700/108 |
| 2008/0077256 | A1* | 3/2008 | Muenz | G05B 13/024 700/30 |
| 2013/0007546 | A1* | 1/2013 | Grady | G01R 31/31835 714/726 |
| 2015/0199583 | A1* | 7/2015 | Nagatomo | G06T 7/74 382/145 |
| 2017/0161412 | A1* | 6/2017 | Mi | G06F 30/20 |
| 2018/0005366 | A1* | 1/2018 | Sato | G06K 9/6212 |
| 2018/0181667 | A1* | 6/2018 | Kolb | G06F 16/9024 |
| 2018/0300434 | A1* | 10/2018 | Hu | G03F 7/70508 |

OTHER PUBLICATIONS

Ruscio, John, "A Probability-Based Measure of Effect Size: Robustness to Base Rates and Other Factors," Psychological Methods, vol. 13, No. 1, 19-30, (2008) (12 pages).

\* cited by examiner

*Primary Examiner* — Ming Y Hon
(74) *Attorney, Agent, or Firm* — Alliance IP, LLC

(57) ABSTRACT

A method includes, for each data object of a plurality of data objects, performing a measurement on a plurality of instances of the data object to generate a plurality of measurement values for the data object, and generating a distribution of the measurement values for the data object. The method further includes generating an aggregate distribution based on each of the distributions of the measurement values generated for the data objects, and scoring a first data object of the plurality of data objects based on the distribution of the measurement values for the first data object and the aggregate distribution.

20 Claims, 8 Drawing Sheets

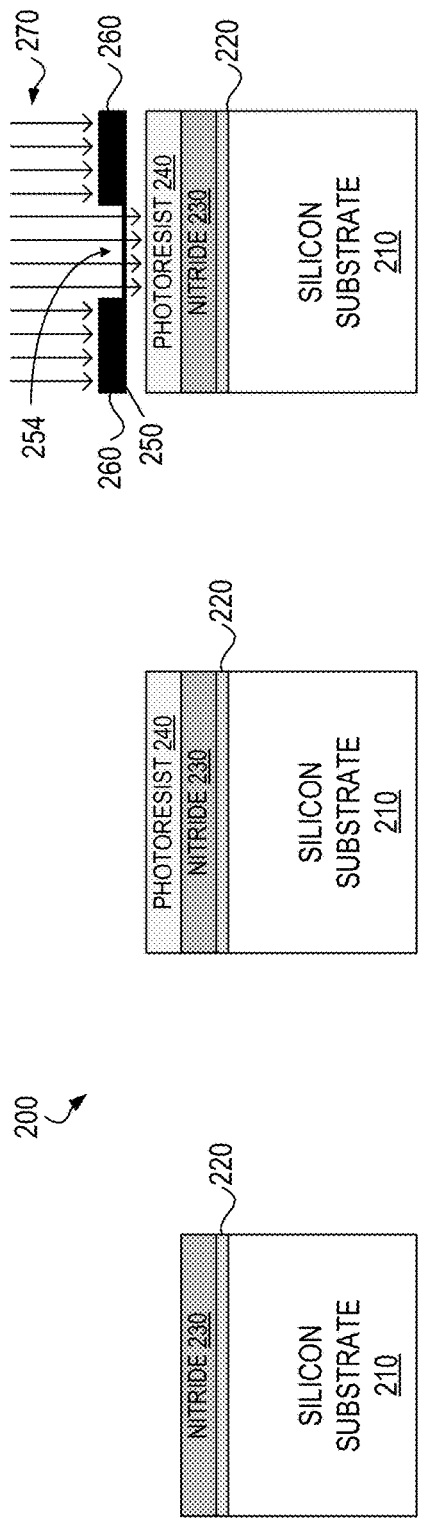

RANKING OF OBJECTS WITH NOISY MEASUREMENTS

TECHNICAL FIELD

This disclosure relates in general to the field of computing systems and, more particularly, to ranking objects with noisy measurements.

BACKGROUND

Cutting-edge semiconductor manufacturing processes are terribly complex. Housed in billion-dollar factories and comprising hundreds of processing steps to yield a finished device, they are capable of reliably printing features as small as 10 nm hundreds of billions of times across wafers that extend a foot in diameter. Developing a new semiconductor manufacturing process requires defining a set of design rules that establish constraints that a semiconductor device must follow to ensure manufacturability. Process development also involves developing optical proximity correction (OPC) recipes that adjust physical design features before they are printed on a mask to help counter feature distortions caused by various processing steps.

Scanning electronic microscopy (SEM) or other images taken during wafer manufacturing can help identify physical design patterns and geometries that may explain manufacturing defects. These patterns and geometries can be used to help define the design rules and OPC recipes for a process. The manufacture of a single wafer can generate a large amount of image data given the large wafer size and number of processing steps in modern processes. As a process matures, manufacturing defects occur less frequently, making them hard to find in a vast sea of image data.

BRIEF DESCRIPTION OF THE DRAWINGS

FIGS. 2A-2F illustrate an exemplary photolithography process in accordance with certain embodiments.

Like reference numbers and designations in the various drawings indicate like elements.

DESCRIPTION OF EXAMPLE EMBODIMENTS

Figure 1A:
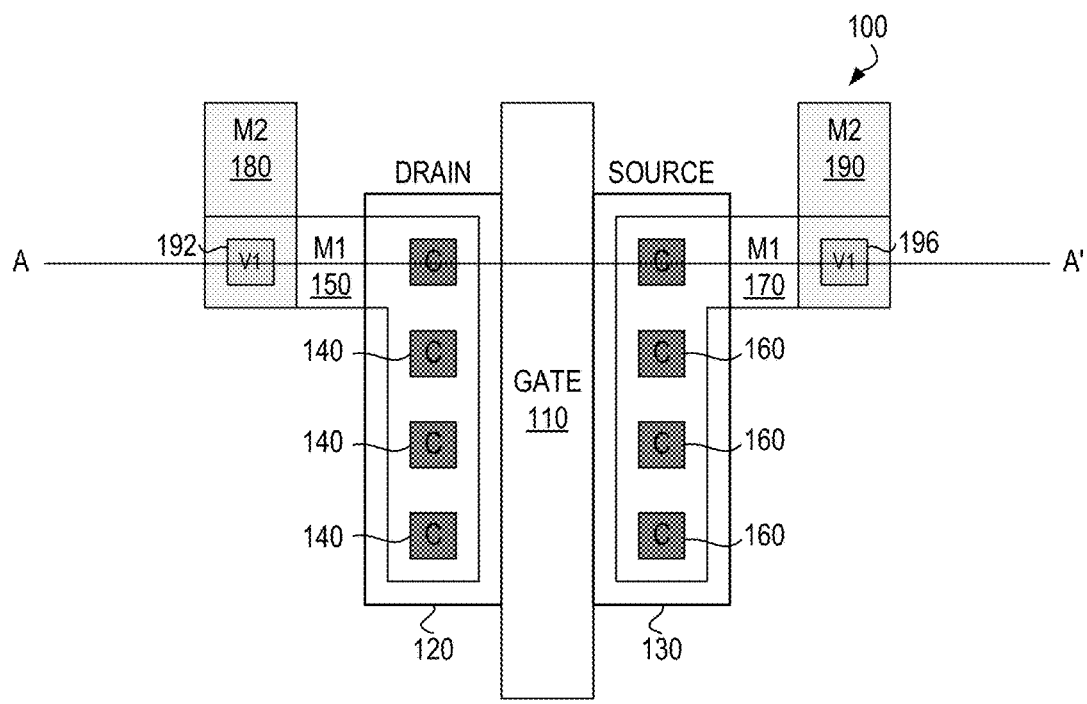
FIG. 1A illustrates the physical design of an exemplary planar transistor in accordance with certain embodiments.

Semiconductor manufacturing has become increasingly complex over the years. Since the turn of the century, the minimum feature size has shrunk by over an order of magnitude as the industry has progressed from the 130 nanometer (nm) to 10 nm technology nodes. At the same time, processor complexity has dramatically increased. Current flagship products have transistor counts that well exceed 10 billion. To handle these reduced feature sizes and increased chip complexities, companies must invest billions of dollars and years of research to build state-of-the-art fabrication facilities. Research and development costs are driven ever-upward by the rising cost of increasingly sophisticated equipment needed for advanced processes. The industry has taken steps to decrease per-transistor manufacturing costs (for example, by moving from 200 mm to 300 mm wafers at the 90 nm technology node), but the overall trend has been for each process generation to cost more than the last. With up to hundreds of individual dies on wafers that span a foot in diameter, the total number of transistors that can be printed on a wafer is on the order of one trillion. Developing high-volume manufacturing processes that can reliably manufacture transistors at such an extreme scale presents considerable challenges.

One such challenge is discovering the patterns and geometries in a physical design responsible for limiting process yield. Manufacturing defects can be discovered through analysis of images generated by an imaging tool during wafer manufacturing, but the amount of image data that is to be analyzed to locate defects can be tremendous (up to millions of images). As a process matures, the presence of a manufacturing defect in the mountain of image data that can be generated may be a rare event. Once defects are located, determining whether a particular physical design pattern or geometry is responsible for a class of defects is another difficult task, particularly considering the amount of data that to be analyzed.

The technologies described herein extract semantic patterns from large amounts of silicon data to aid in semiconductor manufacturing process development. Large numbers of images are analyzed for the presence of manufacturing defects in areas of interest on a wafer. A continuous itemset is generated with items containing the values of physical design features corresponding to the areas of interest and an event value indicating the presence or absence of a manufacturing defect at that location. Entropy-based discretization is performed on the discretized itemset to generate a set of candidate semantic patterns. As used herein, the phrase "semantic pattern" refers to one of more sentences or phrases describing constraints on one or more physical design feature values. A semantic pattern can describe a single value for a feature, "gate length=20 nm," a range of values for a feature, "gate endcap space 18 nm," and constraints for multiple features, "gate length=20 nm, gate endcap space 18 nm."

The set of candidate semantic features is reduced to a set of final semantic features that are ranked and presented to a user, such as a process engineer. The semantic features can be ranked based on their accuracy, coverage, interpretability, and independence. Generally, top-ranked semantic patterns are generally those that do a good job of explaining manufacturing defects (the patterns are accurate and provide good defect coverage, as will be discussed in greater detail below) and are simple for a user to understand. The user can use extracted semantic patterns to improve a process by updating the design rule set for a process, improving an optical proximity correction (OPC) recipe, or in other manners.

Reference is now made to the drawings, wherein similar or same numbers may be used to designate same or similar parts in different figures. The use of similar or same numbers in different figures does not mean all figures including similar or same numbers constitute a single or same embodiment.

Turning now to FIGS. 1-3, an overview of various aspects of semiconductor device manufacturing is presented. FIG. 1A illustrates the physical design of an exemplary planar transistor. As will be discussed in greater detail below, the physical design of a transistor is used to generate the masks that will be used during manufacturing to print the features on a wafer needed to implement a particular design. The physical design is typically a set of polygons drawn at various layers, such as a gate layer, contact layer, and metal-1 layer.

Transistor 100 is a field-effect-transistor (FET), the transistor type that comprises the bulk of transistors used in modern semiconductor devices. Transistor 100 comprises gate 110, drain 120, and source 130 regions. The gate region in a FET can be thought of as an "on-off" switch that controls the flow of current between drain and source regions. When gate 110 is "off", there is no (or little) current flowing through a channel region that connects drain 120 to source 130 and when gate 110 is "on", current readily flows through the channel region. Transistor 100 is connected to other transistors by a set of interconnect layers stacked vertically on top of transistor 100. Contacts 140 connect drain 120 to segment 150 of a first metal layer (M1), and contacts 160 connect source 130 to M1 segment 170. M1 segments 150 and 170 are in turn connected to a second metal layer (M2) segments 180 and 190 by a first layer of "vias" (V1) 192 and 196, respectively. In general, metal layer thickness increases as one moves up the interconnect stack, with thinner lower-level metals being generally used for the local routing of signals and thicker upper-level metals being used for global signal routing and power/ground planes. For simplicity, FIG. 1A shows only two levels of metal. Current semiconductor manufacturing processing have up to ten layers of metal interconnects.

Figure 1B:
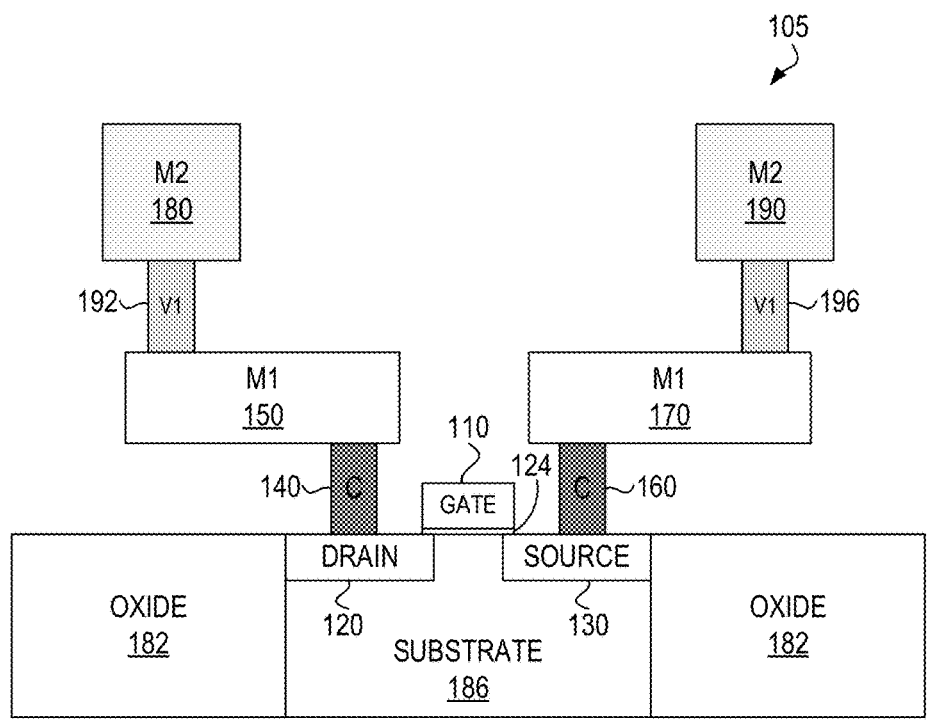
FIG. 1B illustrates an exemplary cross-section of the planar transistor of FIG. 1A taken along the line A-A' in accordance with certain embodiments.

FIG. 1B illustrates an exemplary cross-section of the planar transistor of FIG. 1A taken along the line A-A'. Cross-section 105 shows gate 110 separated from drain 120 and source 130 regions by high-k dielectric layer 124, which electrically insulates gate 110 from drain 120 and source 130. Transistor 100 is in substrate region 186 and is insulated from adjacent transistors by oxide regions 182. The planar transistor illustrated in FIGS. 1A and 1B is just one type of transistor topography, the planar nature of the transistor reflecting that the gate, source, and drain regions are located on or are adjacent to a relatively planar surface. Another type of transistor topography is the non-planar transistor topography used in FinFETS, which are used extensively in cutting-edge manufacturing processes. FinFETS are field-effect transistors that operate under the same general principle as planar FET transistors—a gate controls the flow of current between drain and source region—with the variation that the gate wraps around a set of fins that extend vertically upwards from the wafer surface.

Essential to semiconductor manufacturing is the process of photolithography, by which patterns are transferred from a mask onto a wafer. As previously mentioned, masks are used to define the shape and location of various features to be patterned on a wafer for a given process layer. For example, one mask defines where oxide regions are located, another mask defines where high-k dielectrics will be located, another mask defines location of source and drain regions, and yet another mask will define where contacts will be placed. Additional masks may be used to define each metal layer and intervening via layers.

FIGS. 2A-2F illustrate an exemplary photolithography process. Process 200 illustrates how the oxide regions 182 in FIG. 1B can be defined using photolithography. In FIG. 2A, a thin silicon dioxide layer 220 is thermally grown across the top of silicon substrate 210 of a wafer. Silicon nitride layer 230, a protective layer, is deposited on top of silicon dioxide layer 220. In FIG. 2B, photoresist 240 is deposited on top of nitride layer 230. A photoresist is a material whose reactance to an etchant or solvent increases (if a positive photoresist) or decreases (negative photoresist) upon exposure to light. In process 200, photoresist 240 is a positive photoresist. In FIG. 2C, mask 250 with patterns 260 is positioned over the wafer and exposed to light. The light passes through transparent region 254 of mask 250 and exposes photoresist 240. Patterned regions 260 are opaque to the light and the photoresist regions under patterns 260 are not exposed. In FIG. 2D, photoresist 240 is chemically developed and the exposed regions are dissolved. The remaining portions of photoresist 240 can now act as an on-wafer mask to allow for selective processing of the wafer. In FIG. 2E, the wafer is subjected to an etch step that removes a portion of the silicon nitride layer 230, silicon dioxide layer 220, and substrate 210 to create trench 270. In FIG. 2F, the photoresist and nitride layers are removed, and trench 270 is filled with silicon dioxide to create shallow trench isolation (STI) region 280 that serve to keep transistors formed in regions 294 and 298 electrically isolated from each other.

As masks are the means by which features are realized in semiconductor devices, any semiconductor device design must ultimately be reduced to a physical design, the level of design abstraction from which masks are be generated. The physical design of a transistor (such as FIG. 1A), circuit, or processor to be manufactured is often referred to as a "layout." Electronic design automation (EDA) tools allow processor architects and circuit designers to design at levels of abstraction above the physical design level. They are thus spared from having to spend their days drawing polygons in layout tools to realize their designs. Architects typically define their designs using a hardware design language (HDL), such as VHDL or Verilog. Once they have verified that their designs perform as desired, a physical design can be generated automatically using a library of standard layout cells. Circuit designers often seek performance or functionality not available using standard cells and often enter their designs into a schematic capture tool. Once their custom designs are finalized, the circuit schematics are handed off to layout designers who manually craft the custom physical designs.

Regardless of whether a physical design is generated automatically or manually it must conform to a set layout design rules established for a manufacturing process. Design rules are constraints that a physical design must follow to ensure manufacturability. Most design rules express a minimum width or space for a feature, such as, "gate length $\geq 10$ nm," "source/drain diffusion enclosure of a contact 16 nm," and "space between metal-1 traces $\geq 20$ nm." Design rules represent a trade-off between feature density and manufacturability. Being able to print smaller feature sizes can mean more die can be packed onto a wafer but if the process cannot reliably print the smaller features, the resulting reduction in wafer yield can more than offset cost reduction gained by being able to print more die on a wafer.

Developing design rules for a new process can be difficult as unexpected difficulties can arise. For example, a feature may not scale as much as expected from the previous technology generation due to unforeseen difficulties with a new processing step or a new tool. As process engineers develop a new manufacturing process, they continually fine-tune the individual processing steps to remove as many defect sources as possible. At some point, the process has been tuned enough that the remaining defects that need to be rooted out occur so infrequently that they are difficult to find. Process engineers need to find the occurrence of these rare events during process development so that they can determine whether a tweak to the process can be figured out to reduce the occurrence of the rare event, or to add a design rule to the design rule set so that physical design geometries and patterns correlated to a specific defect are kept out of the final physical design.

Once a physical design is clear of design rule violations and has passed other design validation checks, it is passed to the mask generation phase of an EDA flow. The mask generation phase is far from trivial due to the large discrepancy between the wavelength of the light ($\lambda$=193 nm) that has been used since the 90 nm technology node and the minimum feature sizes (10 nm) used in the current processes. The minimum feature size that can be printed clearly in a photolithographic process is limited by the wavelength of the light source used and the semiconductor industry has developed resolution enhancement technologies (RET) to allow for the printing of features well below the 193 nm light source wavelength. A first set of RET techniques works to increase resolution and/or depth of focus, and a second set compensates for distortion effect due to printing features with a wavelength larger than minimum feature sizes as well as those inherent in deposition, etching, and other process steps. The first set includes techniques such as phase-shift masks and double-patterning, and the second set includes optical proximity correction (OPC).

Figure 3A:
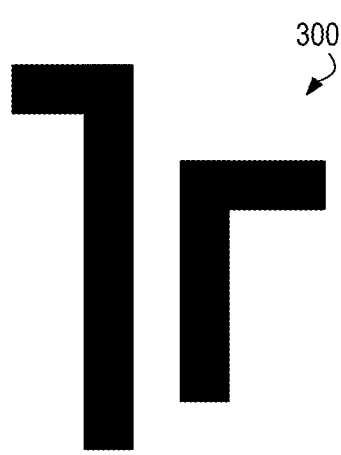
FIGS. 3A-3D illustrate differences between features printed on a mask and those processed on a wafer due to process distortion effects and the use of optical proximity correction to counter those effects in accordance with certain embodiments.
Figure 3B:
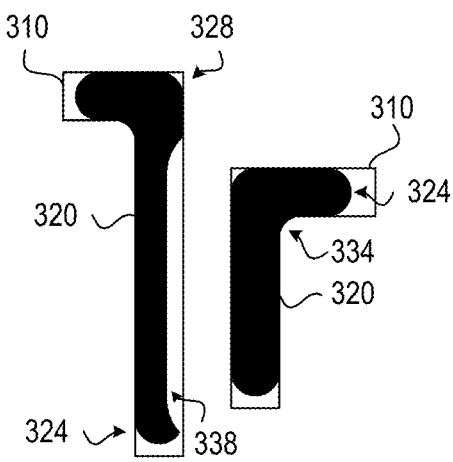
Figure 3C:
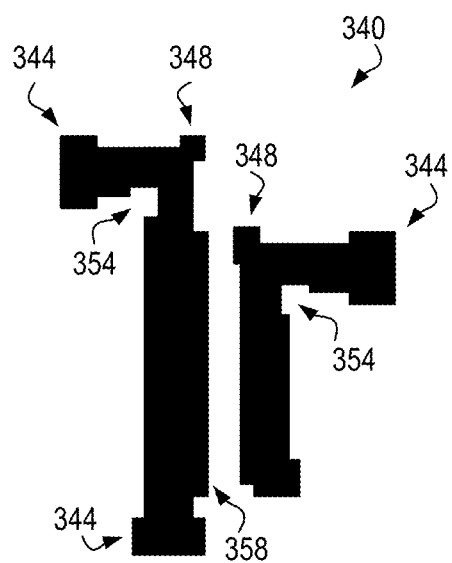
Figure 3D:
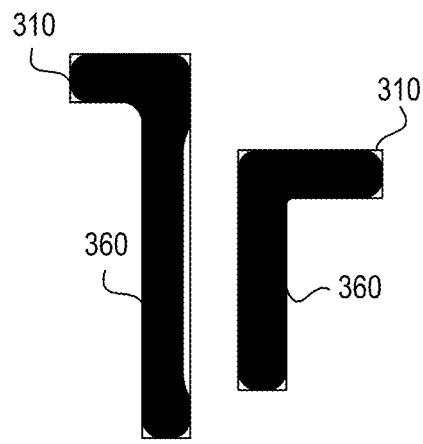

FIGS. 3A-3D illustrate differences between features printed on a mask and those processed on a wafer due to process distortion effects and the use of optical proximity correction to counter those effects. FIG. 3A illustrates two gate polygons 300 in a physical design before being subjected to an OPC process. FIG. 3B illustrates a simplified view of how polygons 300 may appear as processed on a wafer. Outlines 310 represent the boundaries of polygons 300 and shapes 320 represent the corresponding as-processed features. It can be seen that ends 324 and exterior corners 328 of shapes 320 are rounded off, interior corners 334 are filled in, and segment 338 narrowed due to a nearby feature. FIG. 3C illustrates exemplary modified polygons 340 generated by subjecting polygons 300 to an OPC process. Modified polygons 340 are much more complex than original polygons 300. Modified polygons 340 include "dog-bone" features 344 that compensate for end-rounding, "ear" features 348 that compensate for exterior corner-rounding, "mouse-bite" features 354 that compensate for interior corner-rounding, and thickening features 358 that compensate for the presence of nearby features. FIG. 3D illustrates a simplified view of how modified polygons 340 may appear on a wafer after processing. Outlines 310 again represent the boundaries of original polygons 300. As can be seen, modification of polygons 300 by the OPC process results in printed shapes 360 that are closer to the shape and size of original polygons 300. The ends and corners of shapes 360 are less rounded off, the interior corners are less filled in, and the impact of nearby neighbors is diminished.

While OPC generation (and other RET techniques) have allowed minimal features to scale with technology node as the wavelength of the photolithographic light source has remained constant, it does not come without its costs. OPC generation is computationally intensive. OPC recipes can be based on physical models of various processing steps (photolithography, diffusion, etch, deposition, etc.), or be rule-based models that generate OPC features based on individual physical design feature characteristics (width, length, shape, nearest-neighbor characteristics) without relying on the physics of the underlying process steps. The application of model-based OPC recipes to a complete physical design may involve the application of physical models to over 10 billion shapes at the gate layer alone and to billions of additional shapes on other layers. Further, the generation of rule-based OPC models, which may save some of the computational complexity of model-based OPC generation, can be a complex affair. Generation of rule-based OPC recipes can be based on trial-and-error due to a lack of full understanding of the complex physics and chemistries at play in the development of cutting-edge processing technologies. This trial-and-error can comprise iteratively manufacturing features with many variations of candidate OPC recipes and seeing which recipes produce the best results.

Figure 4:
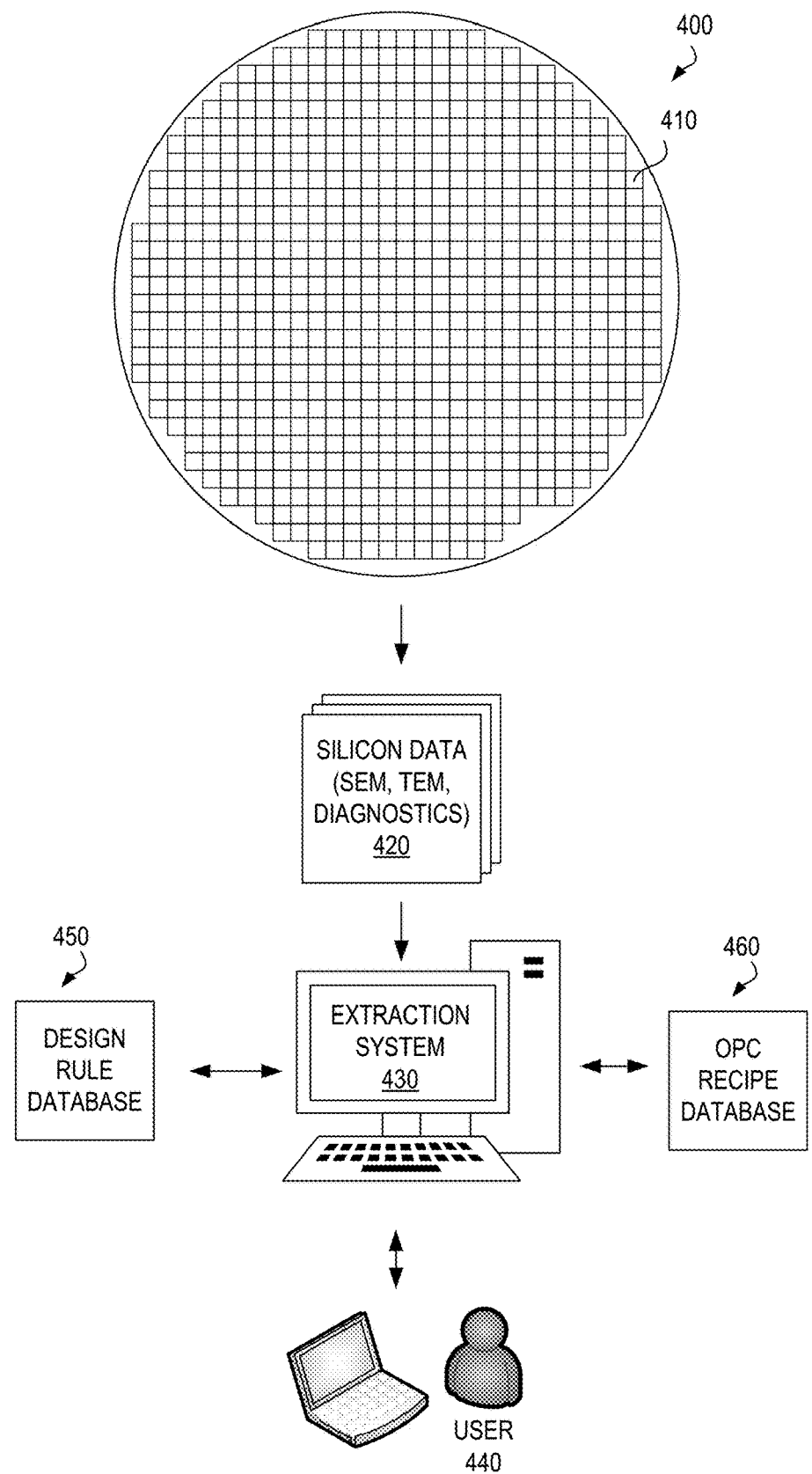
FIG. 4 illustrates an embodiment of silicon data capture and utilization of silicon data to aid semiconductor manufacturing process development in accordance with certain embodiments.

FIG. 4 illustrates an embodiment of silicon data capture and utilization of silicon data to aid semiconductor manufacturing process development. Silicon wafer 400 comprises dies 410. As discussed earlier, current technology nodes employ 300 mm wafers, which can comprise hundreds of dies. The dies are separated by scribe lines that can contain test structures that can be used to monitor the health of manufacturing process and that are consumed by the dicing process, where a wafer is cut into individual dies 410. During the manufacture of silicon wafer 400, silicon data 420 can be generated that can be used for the development of a new process or to monitor the health of a mature one. Silicon data 420 can be any data collected during the manufacturing of wafer 400, such as diagnostic data or images captured by an imaging tool such as a such as a scanning electron microscope (SEM), a transmission electron microscope (TEM), a scanning transmission electron microscope (STEM), or a focus ion beam microscope (FIB). Diagnostic data can include data collected from the scribe line test structures, which can measure electrical properties of varies features or layers (e.g., contact or via resistance, metal layer sheet resistance), or indicate the presence of manufacturing defects by testing for shorts between, for example, gate or metal structures that reflect minimum features or layout patterns of concern.

Any number of images can be generated per wafer. Images can be taken of one or more areas of interest on an individual die for various die on a wafer. For example, images may be taken of the gate layer in a region where the gate patterns are particularly dense (such as in a memory array) and for representative dies across the wafer to capture cross-wafer manufacturing variations. Images can be taken at any point in the manufacturing process. As images can capture a field of view that is hundreds of microns in length and width, individual images can contain many instances of minimum features or areas of interest.

Silicon data 420 can be generated for wafers processed during process development or monitoring and can be generated for wafers processed across fabrication facilities to evaluate cross-facility manufacturing robustness. Given today's large wafer sizes, process complexities, and wafer run rates, the amount of silicon data that can produced during process development or monitoring can be tremendous. The number of images generated during process development alone can reach into the millions.

Silicon data 420 can be supplied to a semantic pattern extraction system 430 that digests copious amounts of silicon data and presents to a process engineer or other user 440 information that may useful in developing a new process or improving an existing one. In some examples, the information provided can be semantic patterns (phrases or sentences that are easily understandable by a human) that suggest which physical design patterns or geometries may be responsible for a defect. In other examples, system 430 can utilize the silicon data 420 to determine one or more design rules that may improve process yield and update design rule database 450 for a process or update an OPC recipe database 460 by updating an existing OPC recipe or creating a new one that may improve yield.

Object ranking is a common technique for organizing and understanding data and may assist the identification of root causes of problems. Objects may be ranked based on measurements for each object. Ranking methods generally rely on a high signal-to-noise ratio of the measurement data. In many applications, such as semiconductor manufacturing, a high signal-to-noise ratio in measurement data is not guaranteed. For example, since the semiconductor manufacturing process involves several complex operations such as lithography, deposition, or etching, the measurements for any layout pattern may be noisy and non-linear. Variations of parameters (e.g., process variations, neighborhood geometries, differences in runs from wafer to wafer) may result in different distributions of measurement values for different patterns (even for patterns that may be similar in nature). Accordingly, the distribution of the measurement values may be unpredictable, and a particular distribution should not be assumed by the ranking method.

In order to rank objects based on their measurements, a score may be assigned to each object. Once each object has been assigned a score, the objects may be sorted based on their scores. One scoring mechanism may assign the mean or median measurement value of an object as the score for the object. Another scoring mechanism may assign the mean measurement value of an object divided by the standard deviation of the object as the score for the object. However, these simple scoring mechanisms are not robust if the distributions of the measurements of the objects have different characteristics, such as different spreads or shapes.

In various embodiments of the present disclosure, a system to provide robust ranking may utilize a statistical scoring system that does not make any assumptions on the distributions of the measurement values. In various embodiments, the difference between the measurement values of the object under consideration and the measurement values of all the objects is quantified and used as the basis for the scoring system. Various embodiments utilize robust effect size metrics for scoring objects and are inspired by the one-versus-all method commonly deployed in machine learning for multiclass classification.

Particular embodiments may utilize a derivative of a common language effect size statistic (CLESS) to quantify the difference between the measurement values obtained for an object with the measurement values obtained for all the objects. Effect size metrics such as CLESS may be used in social science or medical research to quantify the benefit of a new treatment plan by comparing a sample that receives the treatment with a sample that receives a placebo treatment. In various embodiments of the present disclosure, an effect size metric that is robust to non-normal distributions of data may be used to score objects by estimating the probability that a random measurement value of the object under consideration is worse than a random measurement value of all the objects.

Figure 5:
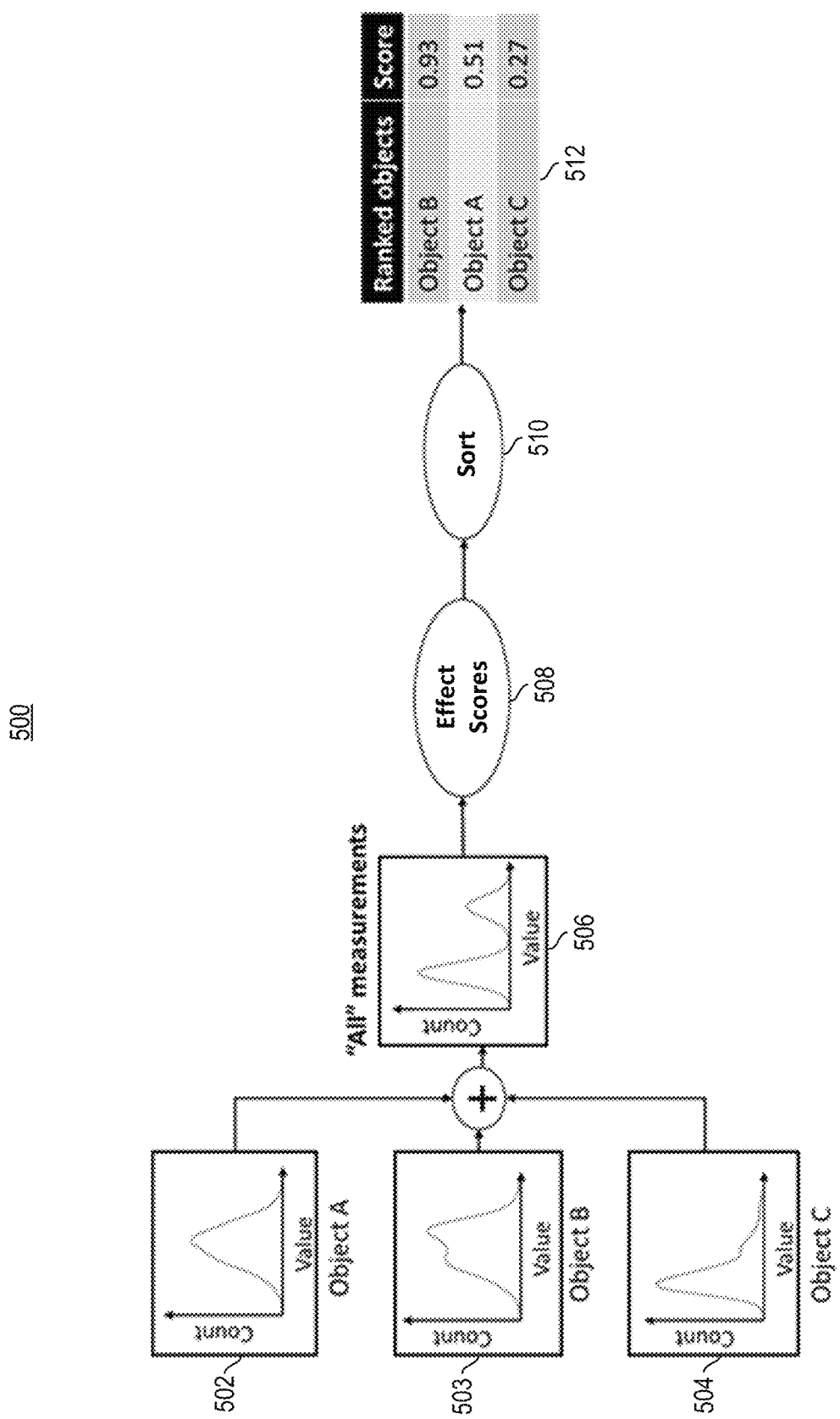
FIG. 5 illustrates a flow for ranking objects in accordance with certain embodiments.
Figure 6:
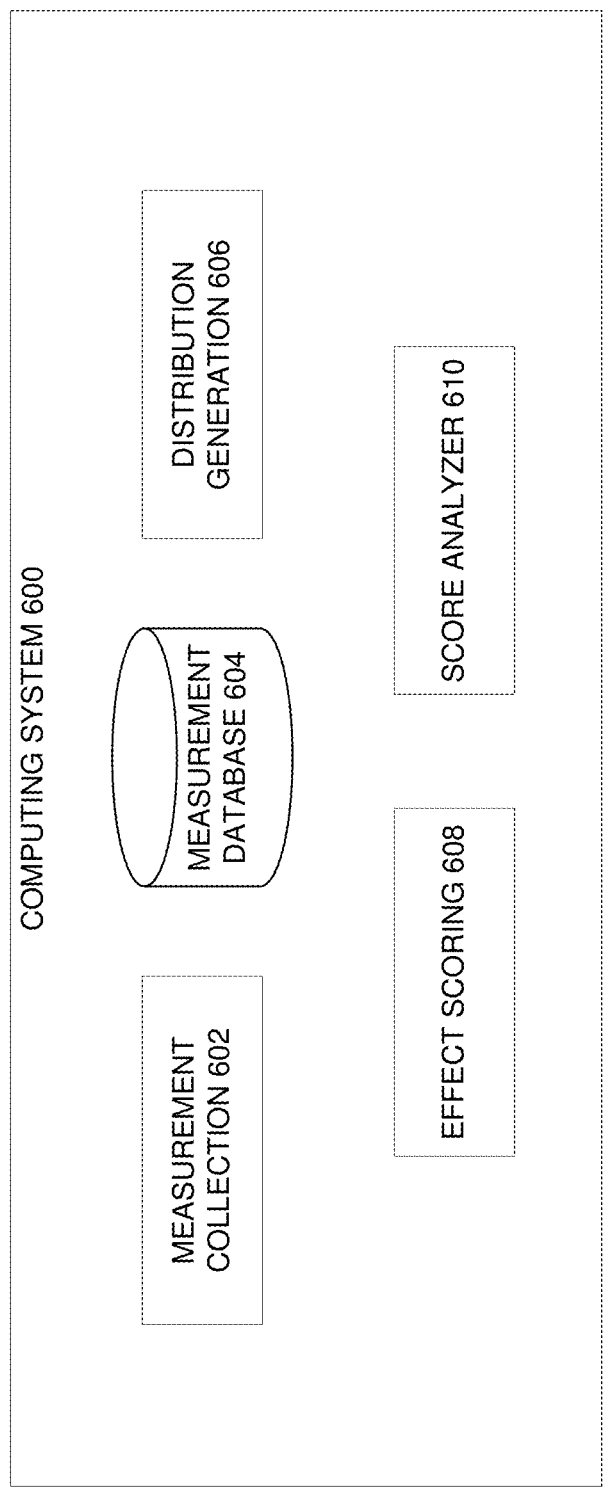
FIG. 6 illustrates a computing system for ranking objects in accordance with certain embodiments.

FIG. 5 illustrates an example flow 500 for ranking objects in accordance with certain embodiments. The flow may be performed by any suitable computing system, such as computing system 600 of FIG. 6. Flow 500 depicts the ranking of three objects (A, B, and C) with respect to a particular measurement type, though various embodiments may rank any suitable number of objects with respect to any one or more measurement types.

The flow depicts a distribution 502 of measurement values for instances of object A, a distribution 503 of measurement values for instances of object B, and a distribution 503 of measurement values for instances of object C. The distributions represent values of the same measurement type made for multiple instances of each of the objects. The measurement values represented in each distribution 502-504 may represent measurements made across any suitable domain, such as measurements of different instances of the respective object across a particular chip, wafer, or group of wafers.

The objects may be any suitable objects. In a particular embodiment, an object corresponds to a layout feature of a semiconductor chip design, such as one or more geometric design patterns of an area defined in a layout database file. Any suitable database file format may be used for the layout database file, such as Graphic Data System II (GDS II), Open Artwork System Interchange Standard (OASIS), or other suitable format. A layout database file may provide a representation of a semiconductor chip in terms of planar geometric shapes (e.g., polygons) corresponding to patterns of, e.g., metal, oxide, or semiconductor layers of the chip. A layout database file may represent the physical placement of various devices on the chip. Such a file may specify the presence or absence of various features on different mask layers for masks used to produce the chip.

Thus, in a particular embodiment, each object may correspond to one or more particular geometric patterns within an area represented by a portion of a layout database file. A geometric pattern may be defined by the contents of one or more layers of the chip. An object may be unique within the chip or may be repeated any number of times across the chip (e.g., dozens of times, hundreds of times, thousands of times, or more). In some embodiments, a chip may include tens of thousands of unique objects. In other embodiments, a chip may include additional or fewer unique objects.

An object may include information about inter-polygon relationships. For example, an object may include all or a portion of a particular polygon (referred to as an anchor point) within a particular window, where the window may have any suitable shape (e.g., square, other rectangle, circle, or other shape) or size. In some embodiments, an object may be defined by an anchor point and zero or more polygons within a window around the anchor point. In various embodiments, the anchor point may correspond to a portion of a chip element, such as a via pillar, a line end of a metal line, a portion of a transistor such as a source, drain, or gate, or suitable chip element or portion thereof.

An object may be defined in any suitable manner with respect to the various layers of the chip. For example, some objects may include only polygons in the same layer as the anchor point, while other objects may include polygons within multiple layers (e.g., layers that are adjacent to the layer of the anchor point). Thus, the window around the anchor point could be in the same layer as the anchor point, could be in one or more different layers, or could be in the same layer and one or more different layers. The number of mask layers included to define particular objects may depend on the particular type of defect being analyzed and the measurements being made. As just one example, when an object includes a via pillar rectangle as an anchor point, the object may include metal line layers above and below the via pillar rectangle.

In a particular embodiment, a first anchor point and a unique pattern around that first anchor point at a first location in the chip design and a second anchor point and a unique pattern around that second anchor point at a second location in the chip design are considered instances of the same object when the anchor points and the unique patterns are the same (or in other embodiments if they are sufficiently similar). Thus, instances of the same object may include areas of the design which include the same or similar anchor point surrounded by neighborhoods that are the same or sufficiently similar to each other (e.g., as determined via fuzzy matching techniques or other suitable method). Thus, different instances of the same object may vary (e.g., slightly) in some embodiments.

While an object may correspond to a portion of a chip design, the measurement values may be obtained by analyzing images taken of various manufactured instances of the object after the instances are fabricated on a chip. For example, the images may be captured by an imaging tool, such as any of those described above (e.g., an SEM), and at least one measurement is performed on the manufactured instance of an object captured in an image (in various embodiments, many different measurements of different types are performed on each instance of an object). In various embodiments, an image may include any suitable number of objects. For example, one portion of the image may correspond to an instance of a particular object while another portion corresponds to an instance of a different object. In some situations, the portions may be discrete or may overlap (e.g., a portion of an instance of a first object may also be a portion of an instance of a second object).

Any suitable measurement type may be applied, e.g., by measurement collection module 602, to the various instances of the objects (e.g., objects A, B, and C) and stored, e.g., in measurement database 604. For example, a measurement may be a critical dimension of a polygon within the object (e.g., the anchor point). A critical dimension may be, e.g., a width (e.g., size in an x direction) or height (e.g., size in a y direction) of a particular polygon when viewed in a 2D representation. In a particular embodiment, a measurement value may include a critical dimension in one dimension (e.g., a width or a height) or may include or be based on multiple dimensions (e.g., width/height pairs or a ratio of the width and height). Thus, if the measurement type represented in the distributions 502-504 of FIG. 5 was a critical dimension, the different critical dimension values may be the different points on each x-axis (or each point on the x-axis could represent a range of critical dimension values) while each "count" value may represent the number of instances of the respective object having the unique critical dimension value (or a value within the range).

As other examples, a measurement may be an area of a polygon (e.g., via, gate contact, source or drain of a transistor, etc.) within the object, a ratio of an actual area of a polygon (e.g., as measured in an image) relative to the designed area of the polygon (e.g., as indicated by a layout file), a distance between a portion (e.g., an edge or center) of a first polygon and a portion (e.g., an edge or center) of a second polygon (e.g., such a measurement may indicate that a via is too large because it couples to an adjacent metal line), an end-to-end distance of a polygon (e.g., in a metal line this measurement may indicate whether there is a line short), a measure of a line pinch off (e.g., if the line becomes too narrow, conductivity problems may result), a measure of line edge roughness (e.g., low variability among transistor poly lines may be desirable), a measure of misalignment between two layers (e.g., misregistration between two masks), a measure of the roundness of a corner of a polygon, or any other suitable measurements.

Distributions may be created, e.g., by distribution generation module 606. In various embodiments, the distributions 502-504 are histograms with each point on the x-axis representing a bin of one or more values and each bin corresponding to a count value that represents the number of instances of an object with a measurement value within a range of that bin. The bin widths of the histograms may be determined in any suitable manner, where a bin width is the size of the range of measurement values of a particular bin.

As an example, fixed binning may be used, where the bin widths are uniform (that is, the bin width is the same for each bin). As another example, variable binning may be used, where the bin widths are not uniform (e.g., the width of the bins wherein data is denser may be narrower than the width of the bins wherein data is sparser). For example, one bin width may include a single measurement value while another bin may include a range of measurement values, while yet another bin may include a larger range of measurement values. As yet another example, the bin widths may be selected according to the Freedman-Diaconis rule (or a derivative thereof), which may minimize the difference between the area under the empirical probability distribution and the area under the theoretical probability distribution. In a particular embodiment, the bin widths are selected according to the Freedman-Diaconis rule applied to a collection of measurements from a plurality (e.g., all) of the objects under consideration. This method of bin selection may be particular useful when the exact nature of the distribution of the measurement values is not known beforehand.

In some embodiments, the width of the bins and/or the number of bins used may be specified prior to the measurements (e.g., by an operator of the system based on a familiarity of the data under test). In another embodiment, the width of the bins and/or the number of bins used may be specified after the measurements have begun but before the measurements have been completed for all objects (e.g., after enough measurements have been made to yield a reasonable estimate as to the range and/or density of the measurement values). In yet another embodiment, the width of the bins and/or the number of bins used may be specified after all of the measurements have been completed.

In a particular embodiment, the same bin ranges are used for each object measured (e.g., the bins for distribution 502, 503, and 504 may all be the same) so as to facilitate easy aggregation of the count values. For example, in order to compare the histogram of a particular object with the total histogram of all objects, a set of bin widths is decided before the comparisons are performed. This allows for comparison and ranking of different objects without depending on the exact range of measurement values for any object.

After the distributions have been determined for each object being analyzed, the distributions may be combined, e.g., by distribution generation module 606, to form aggregate distribution 506. In a particular embodiment, distribution 506 includes the same bin widths as the individual distributions 502, 503, and 504 and the count value for each bin of the aggregate distribution 506 is obtained by summing the count values for the corresponding bins of the individual distributions. As an example, if a particular bin corresponds to a measurement value of a critical dimension of lengths 20-25 nanometers, and 2,000 instances of object A, 3,000 instances of object B, and 4,000 instances of object C were measured as having a critical dimension between 20 and 25 nanometers, the count for the same bin in the aggregate distribution 506 would be 9,000.

Depending on the volume of the measurement data and system requirements, the measurement data may be stored in memory and read a single time or at least a portion of the data may be read twice. For example, if the measurement data volume is small and/or the accuracy required for the data is small (e.g., measurements that may be represented as floating point data can be converted to the closest integer and stored as integer data) then the data may be read, stored in memory, and the range of the data may be computed. Subsequently, a determination of the number and width of bins is made and then the number of measurements in each bin is determined. As another example, if the measurement data volume is large and it is impractical to store the entirety of the measurement data in memory, the range of the data may be estimated and fine bin widths may be determined prior to reading all of the measurement data (e.g., based on a subset of the data). During a first read, the fine bins may be populated. Later, once all data has been read and accurate estimations of the range and the appropriate bin sizes are determined, these fine bins may be merged to create the final bins of the distributions (e.g., two or more fine bins may be combined into a single final bin).

At 508, an effect score is assigned, e.g., by effect scoring module 608, to each object based on the respective individual distribution for the object (e.g., 502 for object A, 503 for object B, or 504 for object C) and the aggregate distribution 506. In a particular embodiment, the effect score for an object with respect to a particular measurement is determined according to the following equation:

$$\text{EffectScore}_A = \Sigma P(\Delta_A = x) * P(L\Delta_{Aggregate} < x)$$

In this equation, $\text{EffectScore}_A$ is the effect score with respect to a particular measurement for an object A, $P(\Delta_A = x)$ is the probability that for a particular bin x, a random instance of object A has a measurement value within the bin x, and $P(\Delta_{Aggregate} < x)$ is the probability that for a particular bin x, an instance selected at random from all of the objects has a measurement value that is less than the lower limit of the range of the measurement values of the bin (e.g., the value of the cumulative distribution function of the aggregate distribution 506 at bin x). The products of these two probabilities are summed together across each of the bins to generate the effect score for the object A. The effect scores for objects B and C may be determined in a similar manner by substituting $P(\Delta_B = x)$ and $P(\Delta_C = x)$ respectively in the above equation.

In other embodiments, an effect score may be calculated in any suitable manner. For example, any standard effect score equation may be used. As other examples, the effect score may be based on a weighted sum of a distribution (e.g., area under the curve of a histogram) and an area under the overlap between the distribution (e.g., histogram) of an object pattern and the aggregate distribution (e.g., histogram).

Once the effect scores 508 have been determined, the objects may be analyzed based on their scores, e.g., by score analyzer module 610. For example, the objects may be sorted (e.g., in ascending or descending order) based on their effect scores at 510 to generate a sorted list of objects 512. In some embodiments, the results indicated by the list may be used (alone or in conjunction with results from lists generated for other measurements) to identify outliers in order to examine possible defects in the chips or other unexpected behavior. In various embodiments, the scoring methodology described herein may weigh the entire distribution of all of the measurements rather than assuming a standard deviation for each measurement. This may allow for comparison of the object against the total population of the objects to determine whether the behavior of the object follows the behavior of the other objects. Multiple objects that have one or more features in common and that behave in a similar fashion as indicated by their respective effect scores for one or more measurement types may indicate a systematic trend that is a function of the semiconductor process. By ranking semiconductor layout patterns using the embodiments described above, process engineers may derive useful insights about which patterns are limiting yield. As a part of design for manufacturability, patterns with high scores can be added to design rule deck so that circuit designers do not use such patterns (as high scores may represent outliers).

In some embodiments, the scores or information derived therefrom may be presented via an electronic display to facilitate analysis of the associated objects. For example, in various embodiments, score analyzer module 610 may perform a clustering algorithm based on the scores to determine objects that may be behaving similarly and present these results via an electronic display.

Although the present disclosure describes various embodiments useful in the context of semiconductor manufacturing, the embodiments may be used in other contexts for any suitable objects or measurements. As one example, the scoring methodology may be used to analyze a plurality of objects comprising publicly tradable stocks in order to determine which stocks are performing similarly (e.g., over a short term duration). In such embodiments, the measurements could be stock prices, trading volumes, or any other suitable attribute. When the measurements include characteristics (e.g., prices, volumes, etc.) of publicly tradable stocks, the characteristics of different stocks may be normalized before the distributions are aggregated, so as to account for differences (e.g., in prices or volumes) in the characteristics of the stocks. In a particular embodiment, based on effect scores obtained for various different stocks, the rankings of effect scores may be used by a computing system to create a diversified portfolio based on stocks that have different characteristics.

Figure 7:
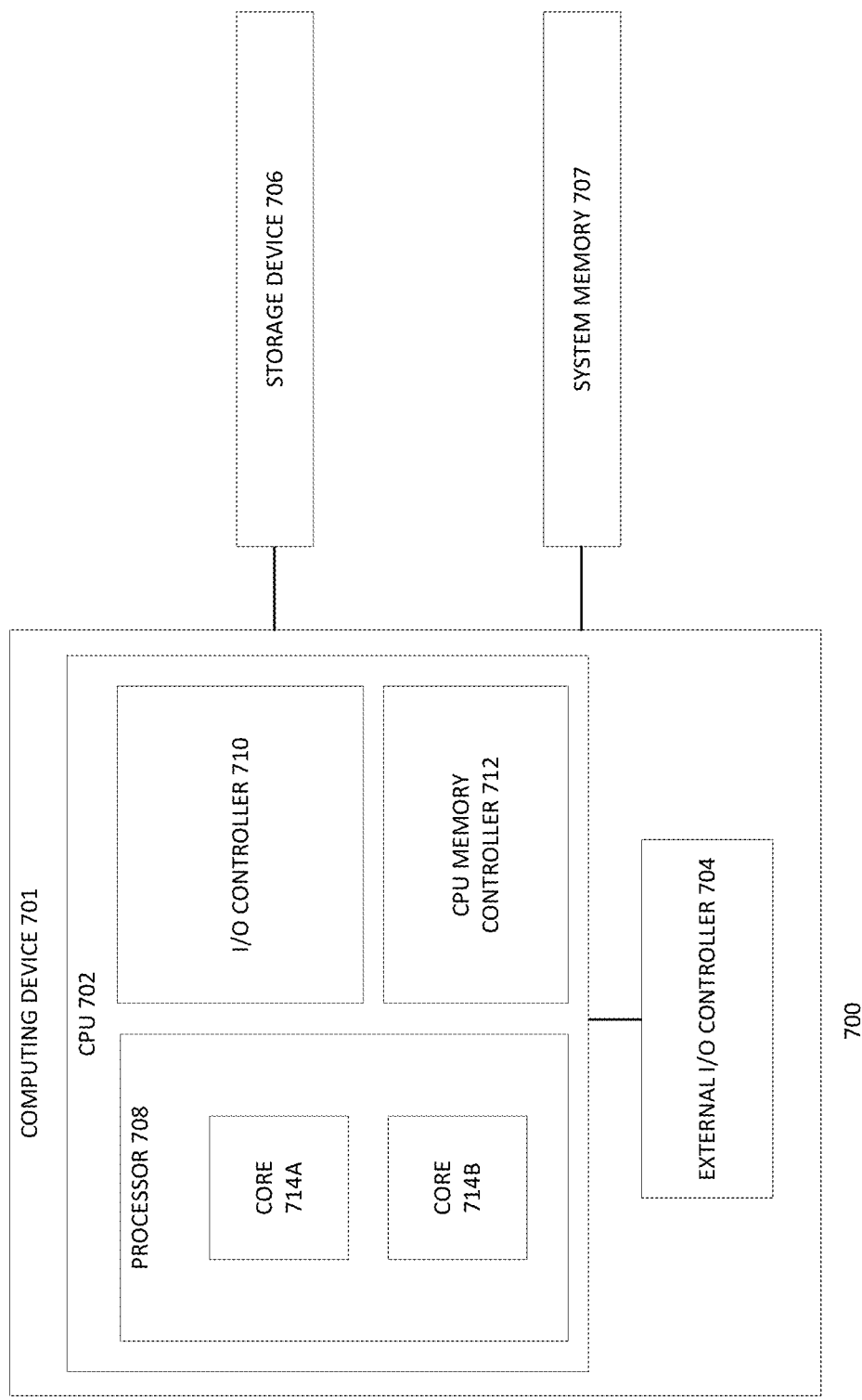
FIG. 7 illustrates a computing system in accordance with certain embodiments.

FIG. 7 illustrates a computing system 700 in accordance with certain embodiments. Any suitable components of system 700 may be used to perform any of the functions described herein, e.g., in connection with FIG. 5 or 8. In a particular embodiment, the components of computing system 600 may be implemented using components of computing system 700. In some embodiments, extraction system 430 or a computing system utilized by a user 440 to communicate with extraction system 430 may implement one or more components of system 700. System 700 includes a computing device 701 comprising a central processing unit (CPU) 702 coupled to an external input/output (I/O) controller 704, storage device 706 (which in some embodiments may store at least a portion of silicon data 420 and/or database 604), and system memory 707. Although various components are illustrated, computing system 700 may include additional other components or multiples of the components illustrated.

During operation, data may be transferred between storage device 706 or system memory 707 and the CPU 702. In various embodiments, particular data operations (e.g., erase, program, and read operations) involving a storage device 706 or system memory 707 may be managed by an operating system or other software application executed by processor 708.

CPU 702 comprises a processor 708, such as a microprocessor, an embedded processor, a digital signal processor (DSP), a network processor, a handheld processor, an application processor, a co-processor, a system on a chip (SOC), or other device to execute code (i.e., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 710 is an integrated I/O controller. I/O controller 710 may include logic for communicating data between CPU 702 and I/O devices, which may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 706 that may be coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 702) or may be integrated on the same chip as the CPU 702.

CPU memory controller 712 is an integrated memory controller. In various embodiments, CPU memory controller 712 may include any one or more characteristics of memory controller 110. CPU memory controller may include logic to control the flow of data going to and from one or more system memories 707. CPU memory controller 712 may include logic operable to read from a system memory 707, write to a system memory 707, or to request other operations from a system memory 707. In various embodiments, CPU memory controller 712 may receive write requests from cores 714 and/or I/O controller 710 and may provide data specified in these requests to a system memory 707 for storage therein. CPU memory controller 712 may also read data from a system memory 707 and provide the read data to I/O controller 710 or a core 714. During operation, CPU memory controller 712 may issue commands including one or more addresses of the system memory 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces. In various embodiments, external I/O controller 704 may include any one or more characteristics of memory controller 110.

A system memory 707 may store any suitable data, such as data used by processor 708 to provide the functionality of computer system 700. For example, data associated with programs that are executed or files accessed by cores 714 may be stored in system memory 707. Thus, a system memory 707 may include a system memory that stores data and/or sequences of instructions that are executed or otherwise used by the cores 714. In various embodiments, a system memory 707 may store persistent data (e.g., a user's files or instruction sequences) that remains stored even after power to the system memory 707 is removed. A system memory 707 may be dedicated to a particular CPU 702 or shared with other devices (e.g., one or more other processors or other devices) of computer system 700.

In various embodiments, a system memory 707 may include a memory comprising any number of memory arrays, a memory device controller (In various embodiments, the memory device controller may include any one or more characteristics of memory controller 110), and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 707 that is volatile memory can comply with JEDEC standards including but not limited to Double Data Rate (DDR) standards, e.g., DDR3, 4, and 5, or Low Power DDR4 (LPDDR4) as well as emerging standards.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that remains stored even after power to the storage device 706 is removed. A storage device 706 may be dedicated to CPU 702 or shared with other devices (e.g., another CPU or other device) of computer system 700.

In various embodiments, storage device 706 includes a storage device controller and one or more memory modules. In various embodiments, a memory module of storage device 706 comprises one or more NAND flash memory arrays, one or more hard disk drives, or other suitable memory storage devices. Storage device 706 may comprise any suitable type of memory and is not limited to a particular speed, technology, or form factor of memory in various embodiments. For example, a storage device 706 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 700 may include multiple different types of storage devices. Storage device 706 may include any suitable interface to communicate with CPU memory controller 712 or I/O controller 710 using any suitable communication protocol such as a DDR-based protocol, PCI, PCIe, USB, SAS, SATA, FC, System Management Bus (SMBus), or other suitable protocol. A storage device 706 may also include a communication interface to communicate with CPU memory controller 712 or I/O controller 710 in accordance with any suitable logical device interface specification such as NVMe, AHCI, or other suitable specification. In particular embodiments, storage device 706 may comprise multiple communication interfaces that each communicate using a separate protocol with CPU memory controller 712 and/or I/O controller 710.

In some embodiments, all, or some of the elements of system 700 are resident on (or coupled to) the same circuit board (e.g., a motherboard). In various embodiments, any suitable partitioning between the elements may exist. For example, the elements depicted in CPU 702 may be located on a single die (i.e., on-chip) or package or any of the elements of CPU 702 may be located off-chip or off-package. Similarly, the elements depicted in storage device 706 may be located on a single chip or on multiple chips. In various embodiments, a storage device 706 and a computing device (e.g., CPU 702) may be located on the same circuit board or on the same device and in other embodiments the storage device 706 and the computing device may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing device (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

Figure 8:
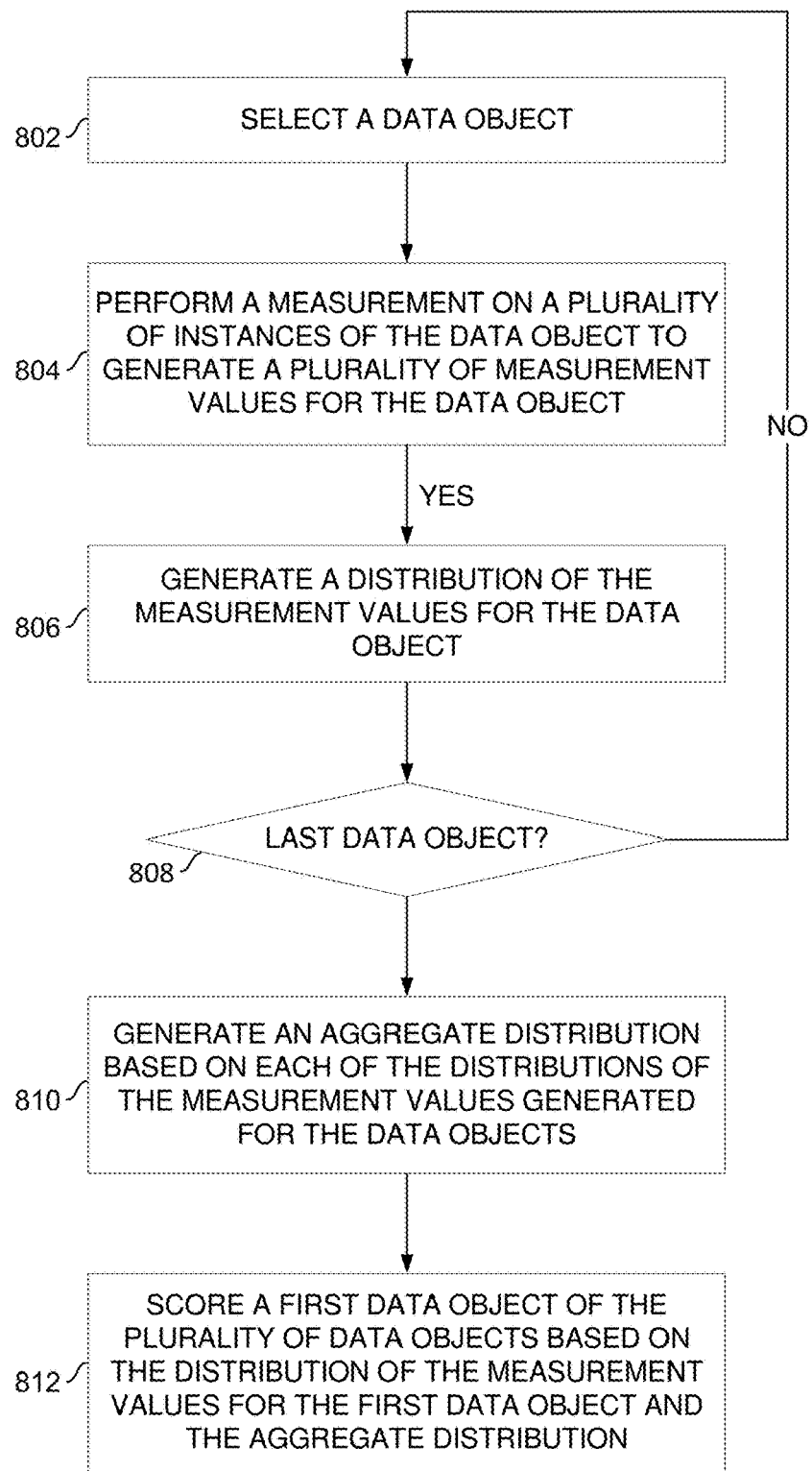
FIG. 8 illustrates a flow for scoring objects in accordance with certain embodiments.

FIG. 8 illustrates a flow for scoring objects in accordance with certain embodiments. The flow may be performed by any suitable computing system, such as those described herein.

At 802, a data object is selected. At 804, a measurement is performed on a plurality of instances of the data object to generate a plurality of measurement values for the data object. At 806 a distribution of the measurement values is generated for the data object.

At 808, a determination of whether the object was the last object to be measured is made. If the object is not the last object, the flow returns to 802. If the object is the last object, the flow moves to 810, where an aggregate distribution is generated based on each of the distributions of the measurement values generated for the data objects. At 812, a first data object of the plurality of data objects is scored based on the distribution of the measurement values for the first data object and the aggregate distribution.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as computing system 600, CPU 702, external I/O controller 704, processor 708, cores 714A and 714B, I/O controller 710, CPU memory controller 712, storage device 706, system memory 707, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is at least one machine readable storage medium having instructions stored thereon, the instructions when executed by a machine to cause the machine to, for each data object of a plurality of data objects, perform a measurement on a plurality of instances of the data object to generate a plurality of measurement values for the data object; and generate a distribution of the measurement values for the data object. The instructions are further to generate an aggregate distribution based on each of the distributions of the measurement values generated for the data objects; and score a first data object of the plurality of data objects based on the distribution of the measurement values for the first data object and the aggregate distribution.

Example 2 may include the subject matter of example 1, wherein generating the aggregate distribution comprises for each bin of a plurality of bins that are each associated with a distinct measurement value range, aggregating a count of instances of the data objects that have a measurement value within a measurement value range of the bin, and associating the aggregated counts of instances with corresponding bins of the aggregate distribution.

Example 3 may include the subject matter of example 2, wherein the instructions when executed are to cause the machine to determine the widths of the plurality of bins based on at least a portion of the measurement values generated for the data objects.

Example 4 may include the subject matter of any of examples 1-3, wherein scoring the data object of the plurality of data objects comprises for each bin of a plurality of bins of the distribution of the measurement values for the data object, multiplying a probability of a random instance of the data object having a measurement value within a measurement value range of the bin by a probability of a random instance of any of the plurality of data objects having a value less than the measurement value range of the bin as indicated by the aggregate distribution; and summing the results of the multiplications.

Example 5 may include the subject matter of any of examples 1-4, wherein the instructions when executed are to cause the machine to score each of the plurality of data objects based on the respective distributions of the measurement values for the data objects and the aggregate distribution; and rank the data objects based on the scores of the data objects.

Example 6 may include the subject matter of example 5, wherein the instructions when executed are to cause the machine to identify data objects that are behaving similarly based on the scores of the plurality of data objects.

Example 7 may include the subject matter of any of examples 1-6, wherein the plurality of data objects are patterns of a semiconductor chip.

Example 8 may include the subject matter of any of examples 1-7, wherein the plurality of data objects each include a respective anchor point and a window around the anchor point.

Example 9 may include the subject matter of any of examples 1-8, wherein the measurements are performed on a plurality of images of manufactured instances of the data objects.

Example 10 may include the subject matter of any of examples 1-9, wherein the plurality of measurement values are critical dimensions of polygons of the data objects.

Example 11 is a method comprising, for each data object of a plurality of data objects, performing a measurement on a plurality of instances of the data object to generate a plurality of measurement values for the data object; and generating a distribution of the measurement values for the data object. The method further comprises generating an aggregate distribution based on each of the distributions of the measurement values generated for the data objects; and scoring a first data object of the plurality of data objects based on the distribution of the measurement values for the first data object and the aggregate distribution.

Example 12 may include the subject matter of example 11, wherein generating the aggregate distribution comprises for each bin of a plurality of bins that are each associated with a distinct measurement value range, aggregating a count of instances of the data objects that have a measurement value within a measurement value range of the bin, and associating the aggregated counts of instances with corresponding bins of the aggregate distribution.

Example 13 may include the subject matter of example 12, further comprising determining the widths of the plurality of bins based on at least a portion of the measurement values generated for the data objects.

Example 14 may include the subject matter of any of examples 11-13, wherein scoring the data object of the plurality of data objects comprises for each bin of a plurality of bins of the distribution of the measurement values for the data object, multiplying a probability of a random instance of the data object having a measurement value within a measurement value range of the bin by a probability of a random instance of any of the plurality of data objects having a value less than the measurement value range of the bin as indicated by the aggregate distribution; and summing the results of the multiplications.

Example 15 may include the subject matter of any of examples 11-14, further comprising scoring each of the plurality of data objects based on the respective distributions of the measurement values for the data objects and the aggregate distribution; and ranking the data objects based on the scores of the data objects.

Example 16 may include the subject matter of example 15, further comprising identifying data objects that are behaving similarly based on the scores of the plurality of data objects.

Example 17 may include the subject matter of any of examples 11-16, wherein the plurality of data objects are patterns of a semiconductor chip.

Example 18 may include the subject matter of any of examples 11-17, wherein the plurality of data objects each include a respective anchor point and a window around the anchor point.

Example 19 may include the subject matter of any of examples 11-18, wherein the measurements are performed on a plurality of images of manufactured instances of the data objects.

Example 20 may include the subject matter of any of examples 11-19, wherein the plurality of measurement values are critical dimensions of polygons of the data objects.

Example 21 is an apparatus comprising a memory to store a plurality of images comprising instances of a plurality of data objects; and a processor coupled to the memory, the processor to, for each data object of the plurality of data objects, perform a measurement on a plurality of instances of the data object to generate a plurality of measurement values for the data object; and generate a distribution of the measurement values for the data object. The processor is further to generate an aggregate distribution based on each of the distributions of the measurement values generated for the data objects; and score a first data object of the plurality of data objects based on the distribution of the measurement values for the first data object and the aggregate distribution.

Example 22 may include the subject matter of example 21, wherein generating the aggregate distribution comprises for each bin of a plurality of bins that are each associated with a distinct measurement value range, aggregating a count of instances of the data objects that have a measurement value within a measurement value range of the bin, and associating the aggregated counts of instances with corresponding bins of the aggregate distribution.

Example 23 may include the subject matter of example 22, wherein the processor is to cause the machine to determine the widths of the plurality of bins based on at least a portion of the measurement values generated for the data objects.

Example 24 may include the subject matter of any of examples 21-23, wherein scoring the data object of the plurality of data objects comprises for each bin of a plurality of bins of the distribution of the measurement values for the data object, multiply a probability of a random instance of the data object having a measurement value within a measurement value range of the bin by a probability of a random instance of any of the plurality of data objects having a value less than the measurement value range of the bin as indicated by the aggregate distribution; and summing the results of the multiplications.

Example 25 may include the subject matter of any of examples 21-24, wherein the processor is to cause the machine to score each of the plurality of data objects based on the respective distributions of the measurement values for the data objects and the aggregate distribution; and rank the data objects based on the scores of the data objects.

Example 26 may include the subject matter of example 25, wherein the processor is to cause the machine to identify data objects that are behaving similarly based on the scores of the plurality of data objects.

Example 27 may include the subject matter of any of examples 21-26, wherein the plurality of data objects are patterns of a semiconductor chip.

Example 28 may include the subject matter of any of examples 21-27, wherein the plurality of data objects each include a respective anchor point and a window around the anchor point.

Example 29 may include the subject matter of any of examples 21-28, wherein the measurements are performed on a plurality of images of manufactured instances of the data objects.

Example 30 may include the subject matter of any of examples 21-29, wherein the plurality of measurement values are critical dimensions of polygons of the data objects.

Example 31 may include the subject matter of any of examples 21-30, wherein the apparatus further comprises an imaging tool to capture the plurality of instances of the plurality of data objects.

Example 32 may include the subject matter of any of examples 21-31, wherein the apparatus further comprises one or more of a battery communicatively coupled to the processor, a display communicatively coupled to the processor, or a network interface communicatively coupled to the processor.

Example 33 may include the subject matter of any of examples 1-6 or 8-10, wherein the plurality of data objects are stocks and the plurality of measurement values are prices of the stocks at particular points in time.

Example 34 may include the subject matter of any of examples 11-16 or 17-20, wherein the plurality of data objects are stocks and the plurality of measurement values are prices of the stocks at particular points in time.

Example 35 may include the subject matter of any of examples 21-26 or 27-32, wherein the plurality of data objects are stocks and the plurality of measurement values are prices of the stocks at particular points in time.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one machine readable storage medium having instructions stored thereon, the instructions when executed by a machine to cause the machine to:
   for each data object of a plurality of data objects:
      perform a measurement on a plurality of instances of the data object to generate a plurality of measurement values for the data object; and
      generate a distribution of the measurement values for the data object, wherein the distribution comprises a plurality of bins, a respective bin having a count value that represents the number of instances of the data object having a measurement value within a range of measurement values associated with the respective bin;
   generate an aggregate distribution based on each of the distributions of the measurement values generated for the data objects; and
   score a first data object of the plurality of data objects based on the distribution of the measurement values for the first data object and the aggregate distribution.

2. The at least one medium of claim 1, wherein generating the aggregate distribution comprises:
   for each bin of a plurality of bins that are each associated with a distinct measurement value range, aggregating a count of instances of the data objects that have a measurement value within a measurement value range of the bin, and
   associating the aggregated counts of instances with corresponding bins of the aggregate distribution.

3. The at least one medium of claim 2, wherein the instructions when executed are to cause the machine to determine the widths of the plurality of bins based on the measurement values generated for the data objects.

4. The at least one medium of claim 1, wherein scoring the data object of the plurality of data objects comprises:
   for each bin of a plurality of bins of the distribution of the measurement values for the data object, multiplying a probability of a random instance of the data object having a measurement value within a measurement value range of the bin by a probability of a random instance of any of the plurality of data objects having a value less than the measurement value range of the bin as indicated by the aggregate distribution; and
   summing the results of the multiplications.

5. The at least one medium of claim 1, wherein the instructions when executed are to cause the machine to:
   score each of the plurality of data objects based on the respective distributions of the measurement values for the data objects and the aggregate distribution; and
   rank the data objects based on the scores of the data objects.

6. The at least one medium of claim 5, wherein the instructions when executed are to cause the machine to identify data objects that are behaving similarly based on the scores of the plurality of data objects.

7. The at least one medium of claim 1, wherein the plurality of data objects are patterns of a semiconductor chip.

8. The at least one medium of claim 7, wherein the plurality of data objects each include a respective anchor point and a window around the anchor point.

9. The at least one medium of claim 7, wherein the measurements are performed on a plurality of images of manufactured instances of the data objects.

10. The at least one medium of claim 7, wherein the plurality of measurement values are critical dimensions of polygons of the data objects.

11. A method comprising:
   for each data object of a plurality of data objects:
      performing a measurement on a plurality of instances of the data object to generate a plurality of measurement values for the data object; and
      generating a distribution of the measurement values for the data object, wherein the distribution comprises a plurality of bins, a respective bin having a count value that represents the number of instances of the data object having a measurement value within a range of measurement values associated with the respective bin;
   generating an aggregate distribution based on each of the distributions of the measurement values generated for the data objects; and scoring a first data object of the plurality of data objects based on the distribution of the measurement values for the first data object and the aggregate distribution.

12. The method of claim 11, wherein generating the aggregate distribution comprises:

for each bin of a plurality of bins that are each associated with a distinct measurement value range, aggregating a count of instances of the data objects that have a measurement value within a measurement value range of the bin, and associating the aggregated counts of instances with corresponding bins of the aggregate distribution.

13. The method of claim 11, wherein scoring the data object of the plurality of data objects comprises:

for each bin of a plurality of bins of the distribution of the measurement values for the data object, multiply a probability of a random instance of the data object having a measurement value within a measurement value range of the bin by a probability of a random instance of any of the plurality of data objects having a value less than the measurement value range of the bin as indicated by the aggregate distribution; and summing the results of the multiplications.

14. The method of claim 11, further comprising:

scoring each of the plurality of data objects based on the respective distributions of the measurement values for the data objects and the aggregate distribution; and ranking the data objects based on the scores of the data objects.

15. The method of claim 11, further comprising identifying data objects that are behaving similarly based on the scores of the plurality of data objects.

16. An apparatus comprising:

a memory to store a plurality of images comprising instances of a plurality of data objects; and a processor coupled to the memory, the processor to:

for each data object of the plurality of data objects:

perform a measurement on a plurality of instances of the data object to generate a plurality of measurement values for the data object; and generate a distribution of the measurement values for the data object, wherein the distribution comprises a plurality of bins, a respective bin having a count value that represents the number of instances of the data object having a measurement value within a range of measurement values associated with the respective bin;

generate an aggregate distribution based on each of the distributions of the measurement values generated for the data objects; and score a first data object of the plurality of data objects based on the distribution of the measurement values for the first data object and the aggregate distribution.

17. The apparatus of claim 16, wherein generating the aggregate distribution comprises:

for each bin of a plurality of bins that are each associated with a distinct measurement value range, aggregating a count of instances of the data objects that have a measurement value within a measurement value range of the bin, and associating the aggregated counts of instances with corresponding bins of the aggregate distribution.

18. The apparatus of claim 16, wherein scoring the data object of the plurality of data objects comprises:

for each bin of a plurality of bins of the distribution of the measurement values for the data object, multiply a probability of a random instance of the data object having a measurement value within a measurement value range of the bin by a probability of a random instance of any of the plurality of data objects having a value less than the measurement value range of the bin as indicated by the aggregate distribution; and summing the results of the multiplications.

19. The apparatus of claim 16, further comprising an imaging tool to capture the plurality of instances of the plurality of data objects.

20. The apparatus of claim 16, further comprising one or more of a battery communicatively coupled to the processor, a display communicatively coupled to the processor, or a network interface communicatively coupled to the processor.

* * * * *